Sept. 24, 1957     C. A. O'MALLEY     2,807,536
METHOD OF REDUCING HIGHLY SILICEOUS CRUDE IRON ORE
Filed Sept. 24, 1956
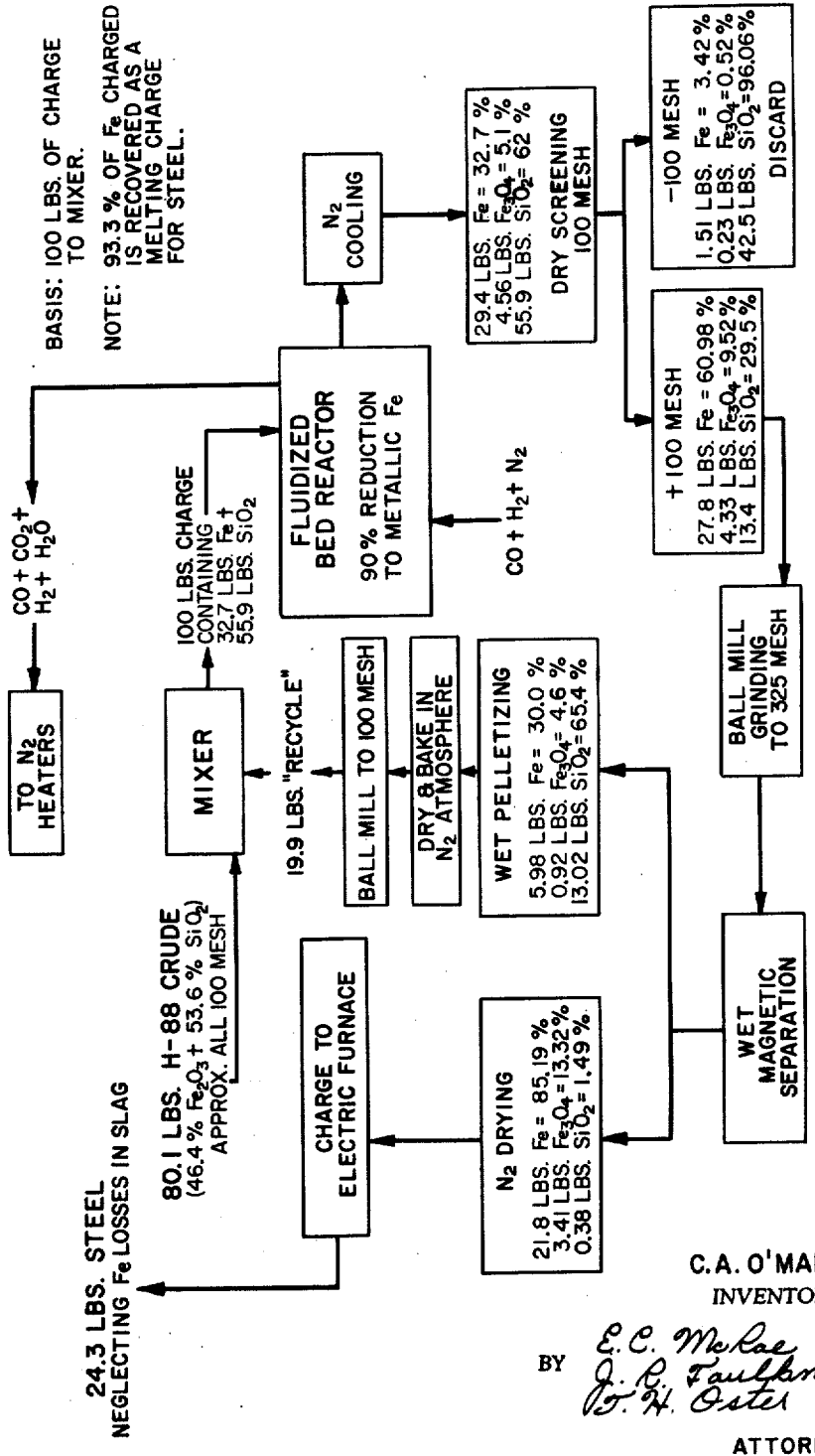

United States Patent Office 2,807,536
Patented Sept. 24, 1957

2,807,536

METHOD OF REDUCING HIGHLY SILICEOUS CRUDE IRON ORE

Charles A. O'Malley, Allen Park, Mich., assignor to Ford Motor Company, Dearborn, Mich., a corporation of Delaware Application September 24, 1956, Serial No. 611,542

5 Claims. (Cl. 75—38)

This invention is specifically directed to a process for producing steel from highly siliceous iron ores in which the reduction is accomplished by gaseous reducing agents at temperatures below the fusion point of the iron ore, the gangue and the reduced iron.

The progressive deterioration of the quality of locally available iron ores has obliged the steel industry to seriously consider the use of the much more plentiful iron ores which are poorer in iron and richer in silica. A typical ore of this caliber contains almost 54 percent silica and only 43 percent ferric oxide. Even after very fine crushing the silica and the iron oxide are intimately associated.

It is now conventional procedure to concentrate this ore by a flotation procedure or magnetic separation to yield a material containing about 90 percent combined oxides of iron along with 7.3 percent silica and 2.3 percent aluminum oxide. Only 3 percent of this material is coarser than 100 mesh. Approximately two-thirds of this material has a screen size between 100 and 325 mesh and approximately one-third is smaller than 325 mesh.

Numerous attempts to reduce a concentrate of this caliber to metallic iron suitable for electric furnace feed have failed because of the difficulties encountered due to the sticking of the freshly reduced iron to the interior of the reactor.

The inventor has discovered that this sticking difficulty may be overcome cheaply by mixing with the concentrated, finely crushed ore, a substantial quantity of ordinary 100 mesh foundry sand. A typical mix is 56 percent Humboldt concentrate with 44 percent of foundry sand. This mix analyzed 44.8 percent $Fe_2O_3$ and 55.3 percent silica and aluminum oxide combined. 1.7 percent of this material was larger than 100 mesh, 81.5 percent screened between 100 and 325 mesh and 16.8 percent was smaller than 325 mesh.

The figure of drawing is a flow sheet of a typical reduction procedure and is thought to be self-explanatory. The reducing gas employed may be any desired mixture of carbon monoxide and hydrogen plus such amounts of nitrogen as are economically unavoidable. The wet magnetic separation is preferably done in a kerosene ambient. As shown by the drawing, the reduction is accomplished in a fluidized bed reactor. The optimum results found to date are tabulated below:

| | |
|---|---|
| Reducing gas feed | 100% $H_2$. |
| Reactor Wall temp | 1300° F. |
| Reduction time for a 180 g. batch of 56% Humboldt Concentrate, 44%—100 mesh foundry sand | 46 min. |
| Av. fluidized bed temp | 1180° F. |
| Overall reduction to metallic iron | 97.1%. |
| Superficial gas velocity | 0.7 ft./sec |
| Wt. percent of total product that was +100 mesh (largely metallic iron) | 46.0%. |
| Wt. percent of total product that was entrained during the reduction run, and recovered | 30.6%. |
| Wt. percent iron, in the entrained product, that could be recovered by dry magnetic separation, and then added to the +100 mesh product | |

| | Beginning of reduction | End of reduction |
|---|---|---|
| Instantaneous reducing gas utilizations varied from | Percent 100 | Percent 1.5 |

It is to be noted that the very fine iron ore being handled by this process agglomerates definitely during the reduction procedure. This benefit is noted in the sharp separation available by a simple 100 mesh dry screening operation in which a feed containing 32.7 percent iron and 5.1 percent magnetic oxide is enriched to a product containing 61 percent iron and 10 percent magnetic oxide by this simple screening procedure. This product is then ball milled back to 325 mesh and put through a wet magnetic separator to yield a product containing 85.2 percent iron and 13.3 percent magnetic oxide which is suitable for charging directly into an electric furnace or other melting medium in which a reducing atmosphere may be maintained. The non-iron fraction from the magnetic separation may well be recycled into the process.

This procedure has been found to completely alleviate reactive troubles traceable to sticking. In so far as sticking is concerned the results obtained with this synthetic mixture are better than those which can be obtained from a ground raw ore of practically the identical composition.

I claim as my invention:

1. The process of producing furnace feed from a highly siliceous crude ore comprising pulverizing the crude ore, eliminating a portion of the silica from the pulverized ore to yield a concentrated ore, mixing with the concentrated ore a substantial quantity of sand, reducing and agglomerating the mixture of sand and ore by means of a gaseous reductant at temperatures below the fusion point of the ore, the gangue and iron, concentrating the iron content of reductate by dry screening and fusing the reductate in an atmosphere which is not oxidizing to iron.

2. The process of producing furnace feed from a highly siliceous crude ore comprising pulverizing the crude ore, eliminating a portion of the silica from the pulverized ore to yield a concentrated ore, mixing with the concentrated ore a substantial quantity of sand, reducing and agglomerating the mixture of sand and ore in a fluidized state by means of a gaseous reductant at temperatures below the fusion point of the ore, the gangue and iron, concentrating the iron content of reductate by dry screening and fusing the reductate in an atmosphere which is not oxidizing to iron.

3. The process of producing furnace feed from a highly siliceous crude ore comprising pulverizing the crude ore, eliminating a portion of the silica from the pulverized ore to yield a concentrated ore, mixing with the concentrated ore a substantial quantity of sand, reducing and agglomerating the mixture of sand and ore by means of a gaseous reductant at temperatures below the fusion point of the ore, the gangue and iron, concentrating the iron content of reductate by dry screening, regrinding the iron rich material separated in the screening operation, magnetically enriching the ground material and fusing the reductate in an atmosphere which is not oxidizing to iron.

4. The process of producing furnace feed from a highly siliceous crude ore comprising pulverizing the crude ore, eliminating a portion of the silica from the pulverized ore to yield a concentrated ore, mixing with the concentrated ore a substantial quantity of sand, reducing and agglomerating the mixture of sand and ore in a fluidized state by means of a gaseous reductant at temperatures below the fusion point of the ore, the gangue and iron, concentrating the iron content of reductate by dry screening, regrinding the iron rich material separated in the screening operation, magnetically enriching the ground material and fusing the reductate in an atmosphere which is not oxidizing to iron.

5. The process of producing furnace feed from a highly siliceous crude ore comprising pulverizing the crude ore, eliminating a portion of the silica from the pulverized ore to yield a concentrated ore, mixing with the concentrated ore an approximately equal weight of sand, reducing and agglomerating the mixture of sand and ore by means of a gaseous reductant at temperatures below the fusion point of the ore, the gangue and iron, concentrating the iron content of reductate by dry screening and fusing the reductate in an atmosphere which is not oxidizing to iron.

No references cited.

UNITED STATES PATENT OFFICE
CERTIFICATE OF CORRECTION

Patent No. 2,807,536                         September 24, 1957

Charles A. O'Malley

It is hereby certified that error appears in the printed specification of the above numbered patent requiring correction and that the said Letters Patent should read as corrected below.

Column 2, line 4, should appear as shown below instead of as in the patent:

mesh product----------------------14.2%

Signed and sealed this 7th day of January 1958.

(SEAL)
Attest:

KARL H. AXLINE
Attesting Officer

ROBERT C. WATSON
Commissioner of Patents